（12）United States Patent
Chen et al.

(10) Patent No.: US 6,891,722 B2
(45) Date of Patent: May 10, 2005

(54) MAGNETIC LOCKING DEVICE

(75) Inventors: Wen-Hsiang Chen, Taipei Hsien (TW);
Kuo-Chang Yang, Hsinchu (TW);
Jung-Wen Chang, Tao Yuan Hsien (TW)

(73) Assignee: Quanta Computer Inc., Taoyuan Hsien (TW)

( * ) Notice: Subject to any disclaimer, the term of this patent is extended or adjusted under 35 U.S.C. 154(b) by 58 days.

(21) Appl. No.: 10/657,163

(22) Filed: Sep. 9, 2003

(65) Prior Publication Data

US 2004/0189017 A1 Sep. 30, 2004

(30) Foreign Application Priority Data

Mar. 24, 2003 (TW) ....................................... 92204557 U

(51) Int. Cl.⁷ ................................................. G06F 1/16
(52) U.S. Cl. .................... 361/685; 361/725; 364/708.1; 335/207
(58) Field of Search ................................ 361/679–687, 361/724–727; 335/205–207; 292/251.5; 364/708.1; 439/638

(56) References Cited

U.S. PATENT DOCUMENTS 6,456,491 B1 * 9/2002 Flannery et al. ............ 361/685
6,653,919 B2 * 11/2003 Shih-Chung et al. ....... 335/207
2004/0189017 A1 * 9/2004 Chen et al. ............... 292/251.5

FOREIGN PATENT DOCUMENTS

TW              461534        10/2001

* cited by examiner

Primary Examiner—Hung Van Duong
(74) Attorney, Agent, or Firm—Rabin & Berdo, P.C.

(57) ABSTRACT

A magnetic locking device is described. The magnetic locking device is utilized for locking an electric device upper cover especially for locking both sides of the display cover of a notebook/tablet dual-purpose personal computer. The magnetic locking device has a lock module and a hook module. The lock module installed in the upper cover has a lock module base, a release button, a magnet, a first bezel and a second bezel. The hook module installed in the electric device base has a hook module base, a spring device, and a hook. The spring device pulls the hook to hide in the electric device base when the hook is not working to improve the electric device appearance and to eliminate interference during operation.

20 Claims, 4 Drawing Sheets

MAGNETIC LOCKING DEVICE

FIELD OF THE INVENTION

The present invention relates to a magnetic locking device and especially to a magnetic locking device for a notebook/tablet dual-purpose personal computer.

BACKGROUND OF THE INVENTION

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, personal digital assistants, color televisions, and are gradually replacing the cathode ray tubes (CRT) used in conventional displays. LCDs are becoming the mainstream display apparatus.

A conventional display of a notebook computer is disposed in the upper cover of the notebook computer. The display demonstrates information and images thereon when the upper cover of the notebook computer is opened. The upper cover and a base of the notebook computer connect to each other with a pivot. Therefore, the working angle of the display can be adjusted according to user requirements by way of adjusting an angle of the upper cover.

Notebook computers are convenient to carry and therefore are often carried to business meetings. A conventional notebook computer uses a hook disposed in the upper cover to lock with a locking module disposed in the computer base for retaining the upper cover in a closed condition when the notebook computer is not working or is traveling.

Due to software and hardware improvements, a tablet personal computer (Tablet PC) combines the notebook computer with a hand writing input device on the display. The tablet PC changes the input habits of the computer user and advances the information industry to a new milestone. A notebook/tablet dual-purpose PC with high processing performance combines the hand writing input device on the display panel with the keyboard input of the notebook computer. The notebook/tablet dual-purpose PC provides a humanizing input interface for a user who usually works in a moving environment. The display of a notebook/tablet dual-purpose PC can rotate about 180 degrees so that viewers around the tablet PC can more easily see the information and images on the display than before.

Because the display of the notebook/tablet dual-purpose PC possesses the hand writing input function and rotation function, the conventional hook and locking module cannot work with the notebook/tablet dual-purpose PC while the display is reversed to input by hand writing on the display. Therefore, there is a need to secure effectively both sides of the display of the notebook/tablet dual-purpose PC on the computer base so as to provide a stable handwriting input environment.

SUMMARY OF THE INVENTION

It is an object of the present invention to provide a magnetic locking device to secure the display on the computer base while the computer is not working.

It is another object of the present invention to provide a magnetic locking device to secure the display on the computer base while the computer is displaying images.

It is yet another object of the present invention to provide a magnetic locking device to secure the display on the computer base while a user inputs information by hand writing on the display.

It is still another object of the present invention to provide a magnetic locking device to hide a hook thereof in the computer base while the display is not closed on the computer base.

To accomplish the above objectives, the present invention provides a magnetic locking device for an electronic appliance, such as a notebook computer or a notebook/tablet dual-purpose personal computer. The electronic appliance includes an upper cover and a base. The magnetic locking device includes a lock module and a hook module.

The lock module is mounted in the upper cover and includes a lock module base, a release button, a magnet, a first bezel, and a second bezel. The first bezel and second bezel may directly form on two sides of the upper cover. The release button and the magnet are disposed between the first bezel and the second bezel.

The hook module is mounted in the base of the electronic appliance and includes a hook module base, a first spring device, and a hook. The first spring device provides a traction force to keep the hook in the hook module base; that is, the hook is stored in the base of the electronic appliance to improve the appearance when the hook is not in use. When a user wishes to lock the upper cover to the base of the electronic appliance, the magnet of the lock module attracts the hook of the hook module to couple with the first bezel after the upper cover is closed on the base. When the user wishes to lock the other side of the upper cover, the magnet of the lock module attracts the hook of the hook module to couple with the second bezel after the upper cover turns 180 degrees and is closed on the base.

When the user wishes to release the upper cover from the base, the release button is pressed so that the hook releases the first bezel or the second bezel. The hook then retracts into the hook module base due to the traction force of the first spring device when the upper cover is opened from the base.

The lock module further comprises a second spring device coupling to the release button to return the release button to an initial position for subsequent use.

The hook further comprises an inclined plane. The inclined plane passes through the first bezel and then the first bezel locks the opening of the hook when the magnet attracts the hook. Alternatively, the inclined plane may pass through the second bezel and then the second bezel locks the opening of the hook when the magnet attracts the hook. The hook module base further includes a sliding slot for the hook to slide therein when the magnet attracts the hook.

The upper cover may include a display of a notebook/tablet dual-purpose personal computer. When the display locks with the first bezel, the display is turned off. When the display locks with the second bezel, the computer exposes the display panel for handwriting or image display. When the user uses the keyboard to input information, the hook hides in the base of the notebook/tablet dual-purpose personal computer.

Hence, the magnetic locking device according to the present invention provides a double side close function and a hiding hook function for electronic appliances. The electronic appliance with the magnetic locking device according to the present invention can lock each side of the upper cover according to different work requirements. The hook can hide in the base of the electronic appliance to improve the appearance and avoid interference when the user inputs information by the keyboard on the base.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1A:
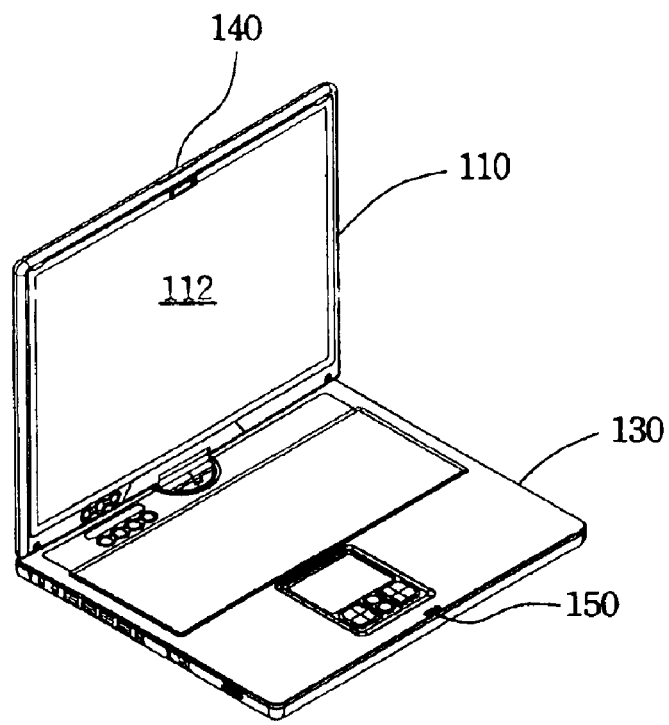
FIG. 1A is a schematic perspective view of a notebook/tablet dual-purpose personal computer having an open display with a magnetic locking device of a preferred embodiment according to the present invention.
Figure 1B:
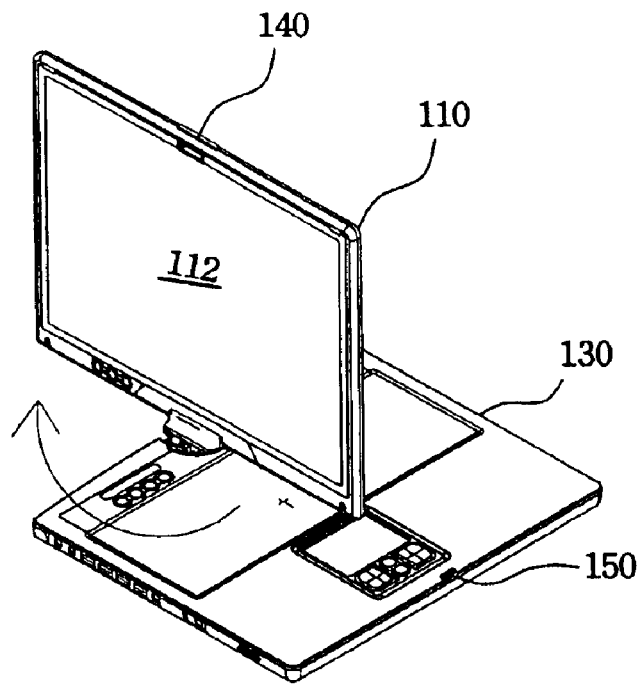
FIG. 1B is a schematic perspective view of the notebook/tablet dual-purpose personal computer in FIG. 1A after the display is rotated 90 degrees.
Figure 1C:
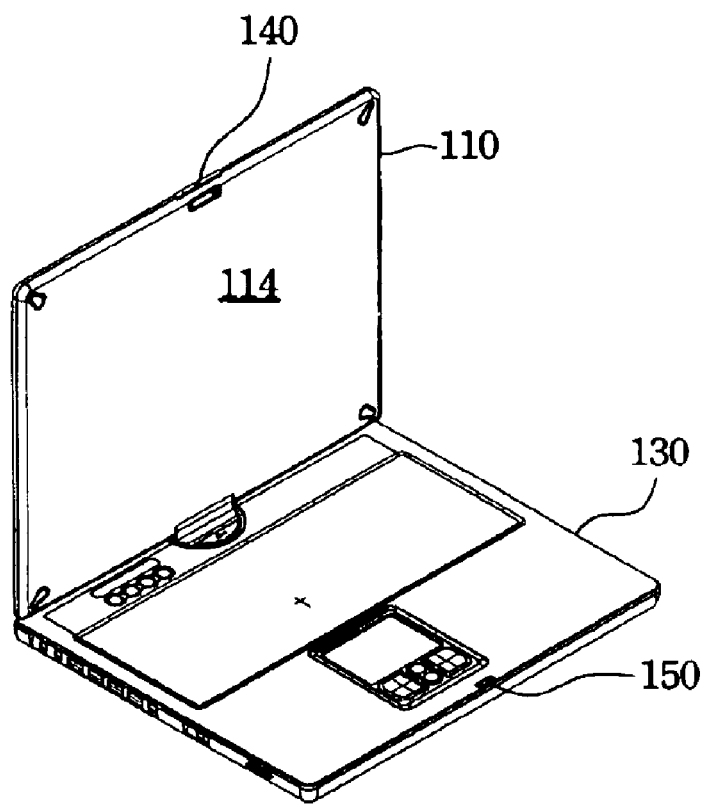
FIG. 1C is a schematic perspective view of the notebook/tablet dual-purpose personal computer in FIG. 1A after the display is rotated 180 degrees.

FIGS. 1A to 1C illustrate a schematic perspective view of a notebook/tablet dual-purpose personal computer having an open display with a magnetic locking device of a preferred embodiment according to the present invention. FIG. 1A illustrates the display as being just opened from a base of a notebook/tablet dual-purpose personal computer. FIG. 1B illustrates the display rotated about 90 degrees from the original position. FIG. 1C illustrates the display rotated about 180 degrees from the original position. Referring to FIGS. 1A to 1C, the notebook/tablet dual-purpose personal computer includes a display 110 and a computer base 130. The display 110 further includes a display panel 112 on the front side of the display 110, a display back cover 114 on the rear side thereof, and a lock module 140. The computer base 130 further includes a hook module 150. As FIG. 1A illustrated, the display 110 can be directly opened, similar to a conventional display of a notebook computer, by pressing the lock module 140 to release the hook module 150.

In FIG. 1B, the display 110 is rotated 90 degrees from the original position, and therefore the display panel 112 faces to the left of the drawing. In FIG. 1C, the display 110 is further rotated 90 degrees again and therefore the display panel 112 faces the back of the notebook/tablet dual-purpose personal computer and the display back cover 114 faces the inner side of the notebook/tablet dual-purpose personal computer. Hence, the display 110 of the notebook/tablet dual-purpose personal computer can be directly rotated about 180 degrees and then pressed to couple the lock module 140 to the hook module 150 when a user wishes to input information by hand writing on the display 110. After the lock module 140 locks the hook module 150, the display panel 112 faces upward, is firmly secured on the computer base 130, and is ready for hand writing input.

Therefore, the magnetic locking device according to the present invention not only effectively secures the display 110 on the computer base 130 when the display is closed but also secures the display 110 on the computer base 130 when the display 110 is turned 180 degrees and pressed down such that the display panel 112 faces upward, as when the computer is in a tablet PC mode.

Figure 2:
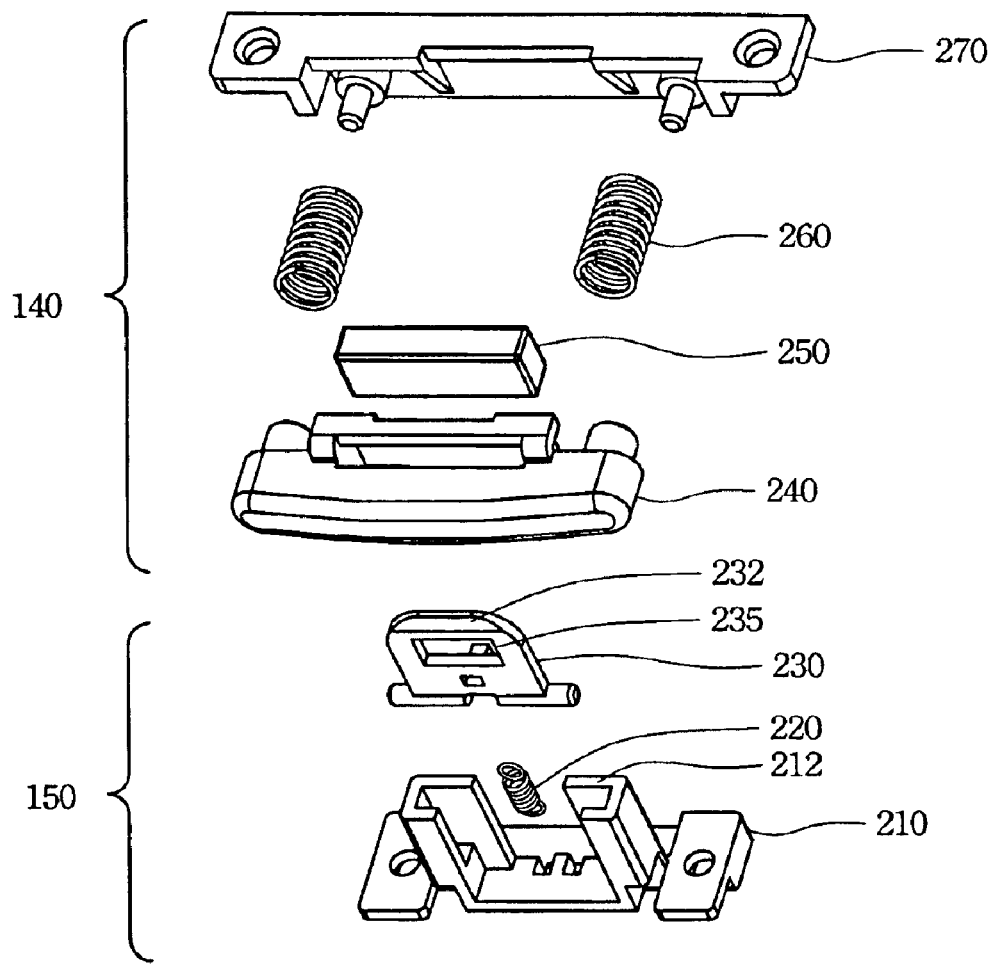
FIG. 2 is a detailed exploded view of the magnetic locking device according to the present invention.
Figure 3:
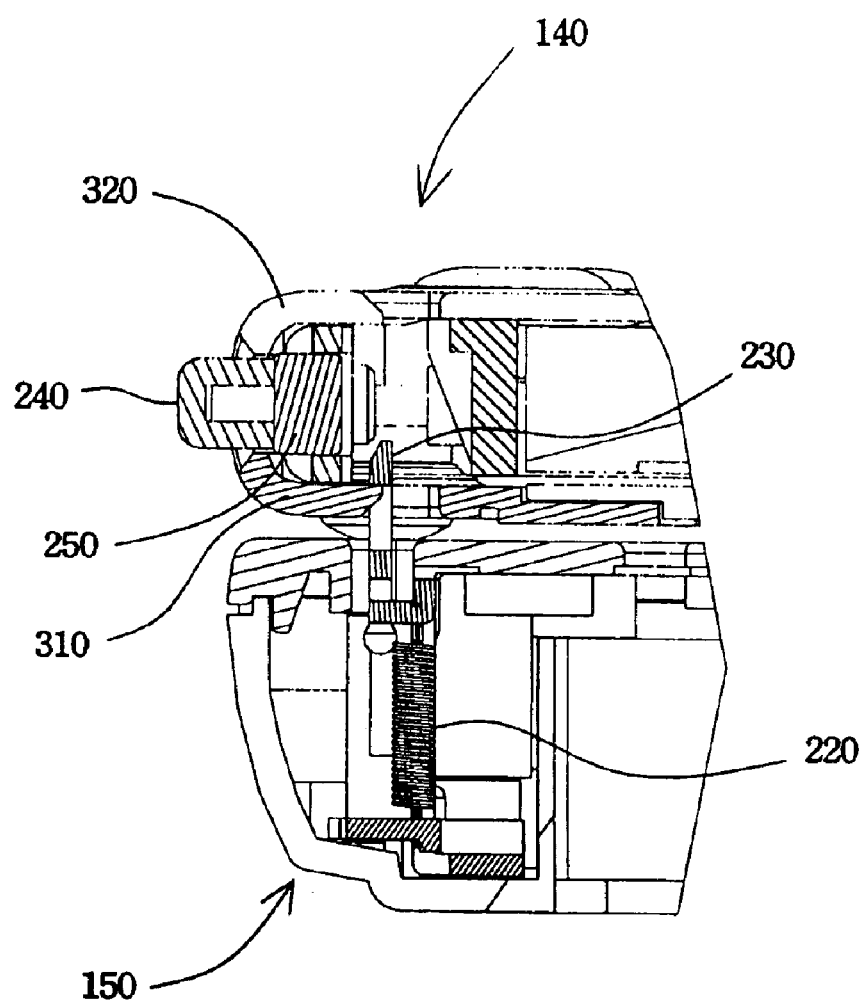
FIG. 3 is a detail cross-sectional view of the magnetic locking device according to the present invention in locking status.

Referring to FIG. 2 and FIG. 3 simultaneously, the operation process of the magnetic locking device according to the present invention is illustrated in detail. FIG. 2 is a detailed exploded view of the magnetic locking device according to the present invention and FIG. 3 is a detailed cross-sectional view of the magnetic locking device according to the present invention in locking status. As illustrated in FIG. 2, the magnetic locking device according to the present invention includes a lock module 140 and a hook module 150. The hook module 150 includes a hook module base 210, a spring device 220, and a hook 230. The lock module 140 includes a release button 240, a magnet 250, spring devices 260 and lock module base 270, and further includes a first bezel 310 and a second bezel 320 (referring to FIG. 3).

The lock module base 270 couples to the display of the notebook/tablet dual-purpose personal computer for fixing the lock module 140 thereon. The hook module base 210 couples to the computer base of the notebook/tablet dual-purpose personal computer for fixing the hook module 150 thereon. The hook module base 210 further includes a sliding slot 212 to retain the hook 230 to slide therein. The spring device 220 couples with hook module base 210 and hook 230 to provide a spring force for the hook 230. While the hook 230 is not working, the hook 230 is not attracted by the magnet 250, and the hook 230 remains in the hook module base 210; that is, the hook 230 hides in the computer base. The spring devices 260 couple with the lock module base 270 and the release button 240 to keep the release button 240 at an initial position for preparing next operation when the release button 240 is released from pressure. The magnet 250 is disposed in an inner side of the release button 240.

The first bezel 310 and the second bezel 320 coupling with the lock module base 270 are respectively located on an upper surface and a lower surface of the display cover in corresponding positions. In the preferred embodiment, the first bezel 310 and the second bezel 320 are directly manufactured on the upper surface and the lower surface of the display cover. Otherwise, the first bezel 310 and the second bezel 320 may also be directly mounted on the lock module base 270. The preferred embodiment description of the first bezel 310 and the second bezel 320 are illustrative of the present invention rather than limiting of the present invention.

Referring to FIG. 3, the operation method of the magnetic locking device according to the present invention is described. The magnetic locking device according to the present invention utilizes the magnet 250 to attract the hook 230, and then the first bezel 310 or the second bezel 320 may couple with the hook 230. Therefore, a notebook/tablet dual-purpose personal computer with the magnetic locking device according to the present invention may easily lock each side of the computer display.

When a user wishes to lock the computer display on the base, the first step is to press down the computer display to close the computer base. In the meantime, the lock module 140 on the computer display closely accesses the hook module 150; the magnet 250 attracts the hook 230 so that the hook 230 overcomes a traction force of the spring device 220 and moves up. An inclined plane 232 of the hook 230 contacts the first bezel 310 to push the hook 230 a little bit towards the rear of the computer. The magnet 250 continually attracts the hook 230 until the inclined plane 232 passes through the first bezel 310 and an opening 235 of the hook 230 reaches the position of the first bezel 310. The first bezel 310 passes through the opening 235 due to the magnetic force of the magnet 250 so that the hook 230 moves a little bit towards the front of the computer. Accordingly, the first bezel 310 locks the hook 230. Therefore, the lock module 140 and the hook module 150 constitute a stable connection so that the computer display is effectively locked on the computer base.

When the user wishes to open the computer display, the first step is to press down the release button 240. In the meantime, the release button 240 pushes the hook 230 towards the rear of the computer so that the opening 235 releases from the first bezel 310, and the lock module 140 and the hook module 150 are separated from each other. After the user moves the display up, the hook 230 loses the attraction force from the magnet 250 and goes back into the hook module base 210 so that the hook 230 hides in the computer base of the notebook/tablet dual-purpose personal computer. The user only needs to open the display to a desired angle for operating the computer. As the user releases the release button 240, the release button 240 returns to the initial position, ready for the next operation, due to the spring force of the spring device 260.

When the user wishes to input data by hand writing on the computer display, the first step is to turn the computer display 180 degrees and press down the computer display to close the lock module 140 on the hook module 150. At the same time, the second bezel 320 is turned downward for coupling with the hook 230 and the first bezel 310 is turned upward. In the meantime, the hook 230 overcomes a traction force of the spring device 220 and moves up due to the magnetic force of the magnet 250. The inclined plane 232 of the hook 230 contacts the second bezel 320 to push the hook 230 a little bit towards the rear of the computer. The magnet 250 continually attracts the hook 230 until the inclined plane 232 passes through the second bezel 320 and the opening 235 of the hook 230 reaches the position of the second bezel 320. The second bezel 320 goes through the opening 235 due to the magnetic force of the magnet 250 so that the hook 230 moves a little bit towards the front of the computer. Accordingly, the second bezel 320 locks the hook 230. Therefore, the lock module 140 and the hook module 150 constitute a stable connecting condition so that the computer display is effectively locked on the computer base. Furthermore, the user may immediately input the information on the display by handwriting or demonstrate any images thereon.

When the user wishes to release the computer display, as described in the foregoing, the first step is to press down the release button 240. In the meantime, the release button 240 pushes the hook 230 toward the rear of the computer so that the opening 235 releases from the second bezel 320 and the lock module 140 and the hook module 150 are isolated from each other. After the user moves the display up, the hook 230 is no longer attracted by the magnet 250 and goes back into the hook module base 210 so that the hook 230 hides in the computer base of the notebook/tablet dual-purpose personal computer. As the user releases the release button 240, the release button 240 returns to the initial position, in preparation for subsequent use, due to the spring force of the spring device 260.

The magnetic locking device according to the present invention utilizes a lock module with a double-side opening easily to lock the computer display with the computer base of the notebook/tablet dual-purpose personal computer so that the computer display may effectively close on the computer base to protect the display from damage and effectively lock on the computer base to stabilize the computer display on the computer base for the convenience of the user when inputting information by hand writing and furthermore displays images thereon without shaking.

The magnetic locking device according to the present invention further utilizes the magnet attraction force effectively to couple the hook on the first bezel or the second bezel. The hook is also hidden in the computer base to prevent the user from an uncomfortable keyboard input environment. Since the hook hiding in the computer base while the display is opened, the appearance of the notebook/tablet dual-purpose personal computer is improved.

Therefore, the magnetic locking device according to the present invention not only steadies and locks the display but also improve aesthetic perception of the appearance. The magnetic locking device according to the present invention is not limited in use to the notebook/tablet dual-purpose personal computer; any product and any equipment with a double-side upper cover to be opened and closed may utilize the magnetic locking device. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A magnetic locking device for an electronic appliance with an upper cover and a base, the magnetic locking device comprising:

a lock module mounted on the upper cover, wherein the lock module further comprises:
        a lock module base attaching on the upper cover;
        a release button coupling to the lock module base;
        a magnet coupling to the release button;
        a first bezel coupling to the lock module base and disposed at one side of the release button and the magnet;
        a second bezel coupling to the lock module base and disposed at another side of the release button and the magnet; and
    a hook module mounted on the base of the electronic appliance, wherein the hook module further comprises:
        a hook module base attached in the base;
        a first spring device coupling to the hook module base; and
        a hook with an opening, the hook coupling to the first spring device and the first spring device providing traction force to keep the hook in the hook module base;
    wherein the magnet of the lock module attracts the hook of the hook module to couple with the first bezel when the upper cover is closed on the base, and the magnet of the lock module attracts the hook of the hook module to couple with the second bezel when the upper cover turns 180 degrees and is closed on the base.

2. The magnetic locking device of claim 1, wherein the hook releases from the first bezel or the second bezel when the release button is pressed and then the hook returns into the hook module base due to the traction force of the first spring device when the upper cover is opened from the base.

3. The magnetic locking device of claim 1, wherein the first bezel is directly formed on one side of the upper cover and the second bezel is directly formed on another side of another side of the upper cover.

4. The magnetic locking device of claim 1, wherein the hook further comprises an inclined plane, the inclined plane passing through the first bezel and the first bezel locking the opening or the inclined plane passing through the second bezel and the second bezel locking the opening when the magnet attracts the hook.

5. The magnetic locking device of claim 1, wherein the hook module base further comprises a sliding slot for the hook to slide therein when the magnet attracts the hook.

6. The magnetic locking device of claim 1, wherein the electronic appliance is a notebook computer.

7. The magnetic locking device of claim 2, wherein the hook hides in the base when the hook returns into the hook module base.

8. The magnetic locking device of claim 2, wherein the lock module further comprises a second spring device coupling to the release button to push the release button back to an initial position for a subsequent operation.

9. The magnetic locking device of claim 6, wherein the notebook computer is a notebook/tablet dual-purpose personal computer.

10. The magnetic locking device of claim 9, wherein the upper cover is a display of the notebook/tablet dual-purpose personal computer.

11. A notebook/tablet dual-purpose personal computer with a magnetic locking device, the notebook/tablet dual-purpose personal computer comprising:
a display cover, wherein the display cover comprises:
a first bezel disposed at one side of the display cover for closing the display cover;
a second bezel disposed at another side of the display cover for hand writing input and displaying images;
a lock module mounting between the first bezel and the second bezel, wherein the lock module further comprises:
a lock module base attaching on the upper cover;
a release button coupling to the lock module base; and
a magnet coupling to the release button;
a computer base, the computer base comprising:
a hook module mounted on the computer base, wherein the hook module further comprises:
a hook module base attached in the computer base;
a first spring device coupling to the hook module base; and
a hook with an opening, the hook coupling to the first spring device and the first spring device keeping the hook in the computer base;
wherein the magnet of the lock module attracts the hook of the hook module to couple with the first bezel when the upper cover is closed on the computer base, and the magnet of the lock module attracts the hook of the hook module to couple with the second bezel when the upper cover turns 180 degrees and is closed on the base for hand writing input and displaying images.

12. The notebook/tablet dual-purpose personal computer of claim 11, wherein the hook releases from the first bezel or the second bezel when the release button is pressed and then the hook returns into the computer base due to the first spring device when the upper cover is opened from the computer base.

13. The notebook/tablet dual-purpose personal computer of claim 11, wherein the hook further comprises an inclined plane, the inclined plane passing through the first bezel and the first bezel locking the opening or the inclined plane passing through the second bezel and the second bezel locking the opening when the magnet attracts the hook.

14. The notebook/tablet dual-purpose personal computer of claim 11, wherein the hook module base further comprises a sliding slot for the hook to slide therein when the magnet attracts the hook.

15. The notebook/tablet dual-purpose personal computer of claim 12, wherein the lock module further comprises a second spring device coupling to the release button to push the release button returning to an initial position for a subsequent operation.

16. An electronic appliance with a magnetic locking device, the electronic appliance comprising:
a display cover, wherein the display cover comprises:
a first bezel disposed at one side of the display cover for closing the display cover;
a second bezel disposed at another side of the display cover for displaying images;
a lock module mounting between the first bezel and the second bezel, wherein the lock module further comprises:
a lock module base attaching on the upper cover;
a release button coupling to the lock module base; and
a magnet coupling to the release button;
an electronic appliance base, the electronic appliance base comprising:
a hook module mounted on the electronic appliance base, wherein the hook module further comprises:
a hook module base attached in the electronic appliance base;
a first spring device coupling to the hook module base; and
a hook with an opening, the hook coupling to the first spring device and the first spring device keeping the hook in the electronic appliance base;
wherein the magnet of the lock module attracts the hook of the hook module to couple with the first bezel when the upper cover is closed on the electronic appliance base, and the magnet of the lock module attracts the hook of the hook module to couple with the second bezel when the upper cover turns 180 degrees and is closed on the base for displaying images.

17. The electronic appliance of claim 16, wherein the hook releases from the first bezel or the second bezel when the release button is pressed and then the hook returns into the electronic appliance base due to the first spring device when the upper cover is opened from the electronic appliance base.

18. The electronic appliance of claim 16, wherein the hook further comprises an inclined plane, the inclined plane passing through the first bezel and the first bezel locking the opening or the inclined plane passing through the second bezel and the second bezel locking the opening when the magnet attracts the hook.

19. The electronic appliance of claim 16, wherein the hook module base further comprises a sliding slot for the hook to slide therein when the magnet attracts the hook.

20. The electronic appliance of claim 17, wherein the lock module further comprises a second spring device coupling to the release button to push the release button returning to an initial position for a subsequent operation.

* * * * *